US009695721B2

(12) United States Patent
Maloney et al.

(10) Patent No.: US 9,695,721 B2
(45) Date of Patent: Jul. 4, 2017

(54) WATER COOLED EXHAUST MANIFOLD

(71) Applicant: Caterpillar Inc., Peoria, IL (US)

(72) Inventors: Ronald Maloney, Peoria, IL (US);
Craig Hittle, Peoria, IL (US);
Christopher Reed, Peoria, IL (US);
Anwarul Karim, Peoria, IL (US);
Daniel Barb, East Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 114 days.

(21) Appl. No.: 14/721,222

(22) Filed: May 26, 2015

(65) Prior Publication Data
US 2016/0348564 A1 Dec. 1, 2016

(51) Int. Cl.
*F01N 1/00* (2006.01)
*F01N 3/04* (2006.01)
*F01N 13/18* (2010.01)

(52) U.S. Cl.
CPC ......... *F01N 3/046* (2013.01); *F01N 13/1827* (2013.01); *F01N 13/1855* (2013.01)

(58) Field of Classification Search
CPC ......... F01N 13/10; F16L 23/02; F16L 23/024; F16L 23/162; F16L 23/18
USPC .......................................................... 60/323
See application file for complete search history.

(56) References Cited

U.S. PATENT DOCUMENTS

| | | | | |
|---|---|---|---|---|
| 3,727,955 A | * | 4/1973 | Carter | F16L 23/0286 285/223 |
| 4,468,925 A | * | 9/1984 | Kersting | F01N 13/10 60/322 |
| 6,142,483 A | * | 11/2000 | Bryant, III | F16J 15/122 277/598 |
| 6,220,605 B1 | | 4/2001 | Becker, Jr. | |
| 6,293,098 B1 | | 9/2001 | Coates | |
| 6,709,023 B2 | | 3/2004 | French | |
| 7,837,233 B2 | | 11/2010 | Johnston et al. | |
| 8,220,843 B2 | | 7/2012 | More et al. | |
| 2008/0258407 A1 | * | 10/2008 | Schimanski | F16L 17/035 277/619 |

(Continued)

FOREIGN PATENT DOCUMENTS

| | | |
|---|---|---|
| CN | 201420593 | 6/2009 |
| CN | 103850771 | 12/2012 |

(Continued)

*Primary Examiner* — Jason Shanske
(74) *Attorney, Agent, or Firm* — Indhira A. LaPuma; Mattingly Burke Cohen & Biederman (57) ABSTRACT

A modular exhaust manifold includes a plurality of exhaust manifold segments coupled together along a common axis. Exhaust manifold segments include a water jacket tube defining a liquid coolant passage around each of the plurality of exhaust manifold segments. The internal combustion engine also includes a coupling assembly for joining adjacent exhaust manifold segments. The coupling assembly includes a plurality of annular sealing devices configured to fit within a first set of grooves formed on an end portion of a first exhaust manifold segment. The coupling assembly also includes a spacing collar configured to attach to the end portion of the first exhaust manifold segment and couple with a fixed radial flange formed on an adjacent end portion of a second exhaust manifold segment to join the first exhaust manifold segment and the second exhaust manifold segment.

20 Claims, 6 Drawing Sheets

(56) References Cited

U.S. PATENT DOCUMENTS

| | | | |
|---|---|---|---|
| 2013/0038027 A1 | 2/2013 | Feldner et al. | |
| 2014/0116036 A1* | 5/2014 | Karim | F01N 3/046 60/321 |
| 2014/0165544 A1* | 6/2014 | Geminn | F01N 13/10 60/323 |
| 2014/0208726 A1* | 7/2014 | Karim | F01N 3/046 60/321 |

FOREIGN PATENT DOCUMENTS

| | | | |
|---|---|---|---|
| JP | WO 2009131105 A1 * | 10/2009 | F16L 19/0286 |
| WO | 201388842 | 6/2013 | |

\* cited by examiner

WATER COOLED EXHAUST MANIFOLD

TECHNICAL FIELD

The present disclosure relates to a water cooled exhaust manifold having individually cooled manifold segments.

BACKGROUND

An exhaust manifold of an internal combustion engine is a collection of conduits through which exhaust gases produced during combustion are carried away from the engine. The exhaust manifold typically receives exhaust gases from each of the engine cylinders through exhaust valve ports in the cylinder head or cylinder block of the engine. The exhaust manifold then routes the exhaust gases through one or more aftertreatment components and/or one or more turbines of a turbocharger before expelling the exhaust gases into the atmosphere. During operation of the engine, the exhaust manifold becomes very hot due to the extremely high temperatures of the exhaust gases passing through the manifold. To reduce skin temperature and improve heat rejection, some exhaust manifolds include a water jacket near an exterior surface of the manifold.

An exemplary exhaust gas line for an internal combustion engine having a cooling liquid space is taught in U.S. Pat. No. 4,693,079 to Wuensche et al. (hereinafter Wuensche). In particular, the Wuensche reference teaches an exhaust gas line assembled of several housings, with each housing containing a cooling liquid space. The cooling liquid spaces of adjacent housings are connected with each other using a connecting nipple. It appears the connecting nipples, along with interconnections between exhaust tube segments, form the connections between the multiple housings. Although a variety of different manifold designs exist in the art, it should be appreciated that there remains a continuing need for manifold designs offering improvements, including, for example, increased surface cooling, ease of manufacture or use, and improved sealing.

The present disclosure is directed to one or more of the problems or issues set forth above.

SUMMARY

In one embodiment, an internal combustion engine includes a cylinder block defining at least one cylinder; a cylinder head coupled to the cylinder block; and a modular exhaust manifold coupled to the cylinder head and configured to receive exhaust gas from the cylinder head. The modular exhaust manifold includes a plurality of exhaust manifold segments coupled together along a common axis. Each of the exhaust manifold segments includes a separate a water jacket tube defining a separate liquid coolant passage around each of the plurality of exhaust manifold segments. The internal combustion engine also includes a coupling assembly for joining adjacent exhaust manifold segments. The coupling assembly includes a plurality of annular sealing devices configured to fit within a first set of grooves formed on an end portion of a first exhaust manifold segment. The coupling assembly also includes a spacing collar configured to attach to the end portion of the first exhaust manifold segment and couple with a fixed radial flange formed on an adjacent end portion of a second exhaust manifold segment to join the first exhaust manifold segment and the second exhaust manifold segment.

In one embodiment, a modular exhaust manifold includes a plurality of exhaust manifold segments coupled together along a common axis. Each of the exhaust manifold segments includes a separate a water jacket tube defining a separate liquid coolant passage around each of the plurality of exhaust manifold segments. The internal combustion engine also includes a coupling assembly for joining adjacent exhaust manifold segments. The coupling assembly includes a plurality of annular sealing devices configured to fit within a first set of grooves formed on an end portion of a first exhaust manifold segment. The coupling assembly also includes a spacing collar configured to attach to the end portion of the first exhaust manifold segment and couple with a fixed radial flange formed on an adjacent end portion of a second exhaust manifold segment to join the first exhaust manifold segment and the second exhaust manifold segment.

In one embodiment, a modular exhaust manifold includes a first exhaust manifold segment and a second exhaust manifold segment. The modular exhaust manifold also includes a coupling assembly for joining the first exhaust manifold segment and the second exhaust manifold segment along a common axis, the coupling assembly including a plurality of annular sealing devices configured to fit within a first set of grooves formed on an end portion of the first exhaust manifold segment and a spacing collar configured to attach to the end portion of the first exhaust manifold segment and couple with a fixed radial flange formed on an adjacent end portion of the second exhaust manifold segment to join the first exhaust manifold segment and the second exhaust manifold segment.

BRIEF DESCRIPTION OF THE DRAWINGS

The accompanying drawings, which are incorporated in and constitute a part of this specification, illustrate several aspects of the disclosure and together with the description, serve to explain the principles of the disclosure. In the drawings.

DETAILED DESCRIPTION

The present disclosure relates to an apparatus for in an internal combustion engine. By means of the improvements embodied in the present disclosure, which will be described subsequently more fully, the operative procedures and effectiveness of the weld will be greatly augmented.

Figure 1:
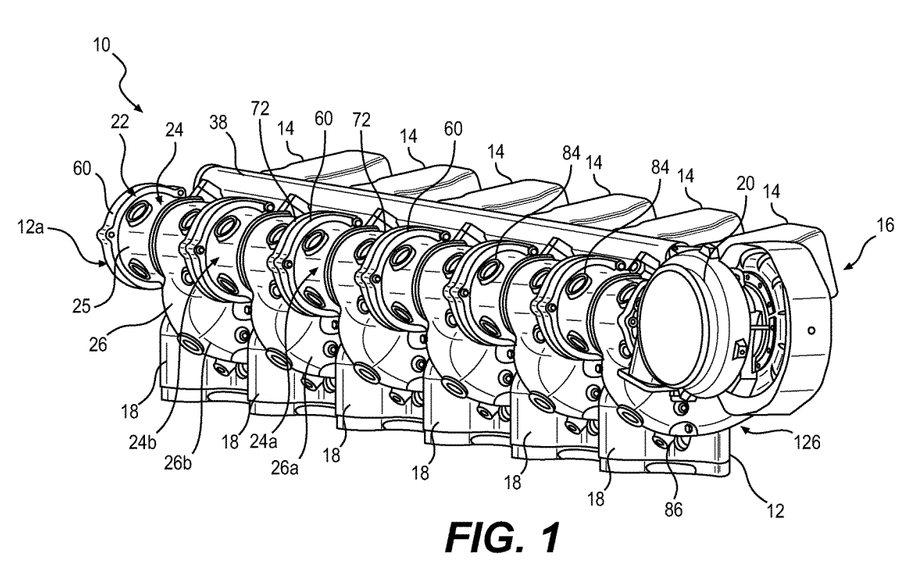
FIG. 1 is a perspective view of an exemplary embodiment of an internal combustion engine including a modular exhaust manifold, according to the present disclosure.

Referring to FIG. 1, there is shown a schematic view of an internal combustion engine 10, which, for purposes of illustration, and not limitation, may be that of a four-stroke, compression ignition engine. The engine 10 generally includes a cylinder block 12, which extends longitudinally between opposing ends 12a and 12b and defines a plurality of combustion chambers or cylinders 14. According to the present disclosure, the engine 10 may be any type of engine (e.g., internal combustion, gas, diesel, gaseous fuel, natural gas, propane, etc.), may be of any size, with any number of cylinders, any type of combustion chamber (e.g., cylindrical, rotary spark ignition, compression ignition, 4-stroke and 2-stroke, etc.), and in any configuration (e.g., "V," in-line, radial, etc.). According to the exemplary configuration, the cylinder block 12 defines two rows of six longitudinally spaced cylinders 14, resulting in a V-12 configuration. However, those skilled in the art will appreciate that any configuration and number of cylinders 14 may be applicable.

The exemplary engine 10 also includes a cylinder head 16 for providing intake and exhaust flow communication with the cylinders 14 of each row. According to the exemplary embodiment, each cylinder head 16 may include a number of cylinder head modules 18 corresponding to the number of cylinders 14 defined by the cylinder block 12. However, it is contemplated that each cylinder head module 18 may serve to provide flow communication with more than one cylinder 14, such as, for example, two, three, or four cylinders 14. The cylinder head modules 18 may be configured to be decoupled individually from the cylinder block 12, thereby permitting removal of a single cylinder head module 18, without necessarily removing any other cylinder head modules 18. This exemplary configuration may serve to simplify maintenance of the engine 10, as should be appreciated by those skilled in the art. The exemplary engine 10 includes a turbocharger 20 located generally at one longitudinal end of engine 10 (e.g., the opposite end 12b of the engine 10). According to the exemplary embodiment, turbocharger 20 may be associated with each cylinder 14; however, other numbers of turbochargers are contemplated, along with embodiments having no turbochargers.

According to the present disclosure, the exemplary engine 10 also includes a modular exhaust manifold 22 coupled to each cylinder head 16 to provide flow communication between exhaust ports of cylinder head 16 and the surroundings. In the exemplary embodiment shown, the modular exhaust manifold 22 extends longitudinally and provides flow communication between the cylinder heads 16 and the turbocharger 20.

Figure 2:
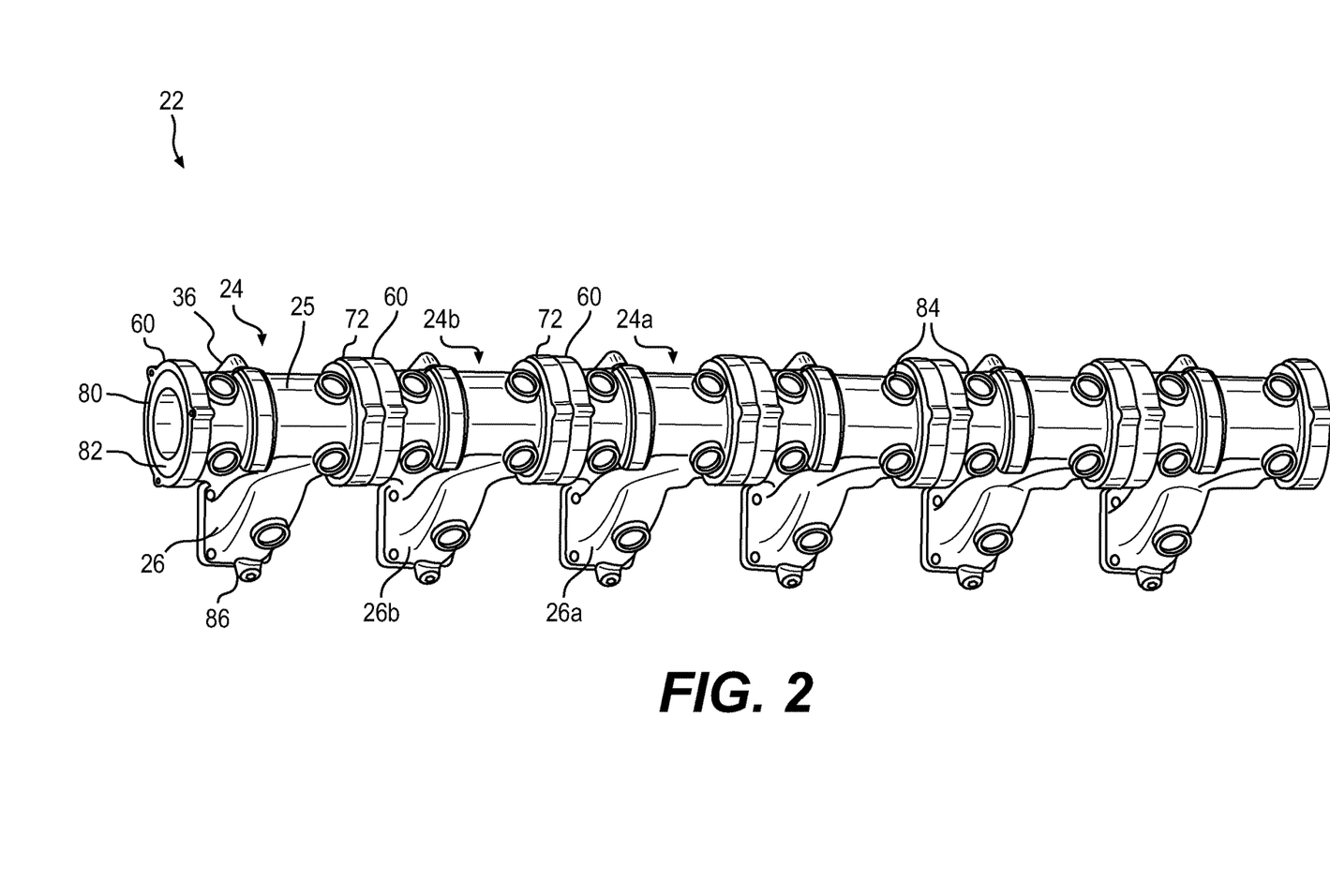
FIG. 2 is a perspective view of a plurality of connected exhaust manifold segments of the exemplary modular exhaust manifold of FIG. 1, according to one aspect of the present disclosure.
Figure 3:
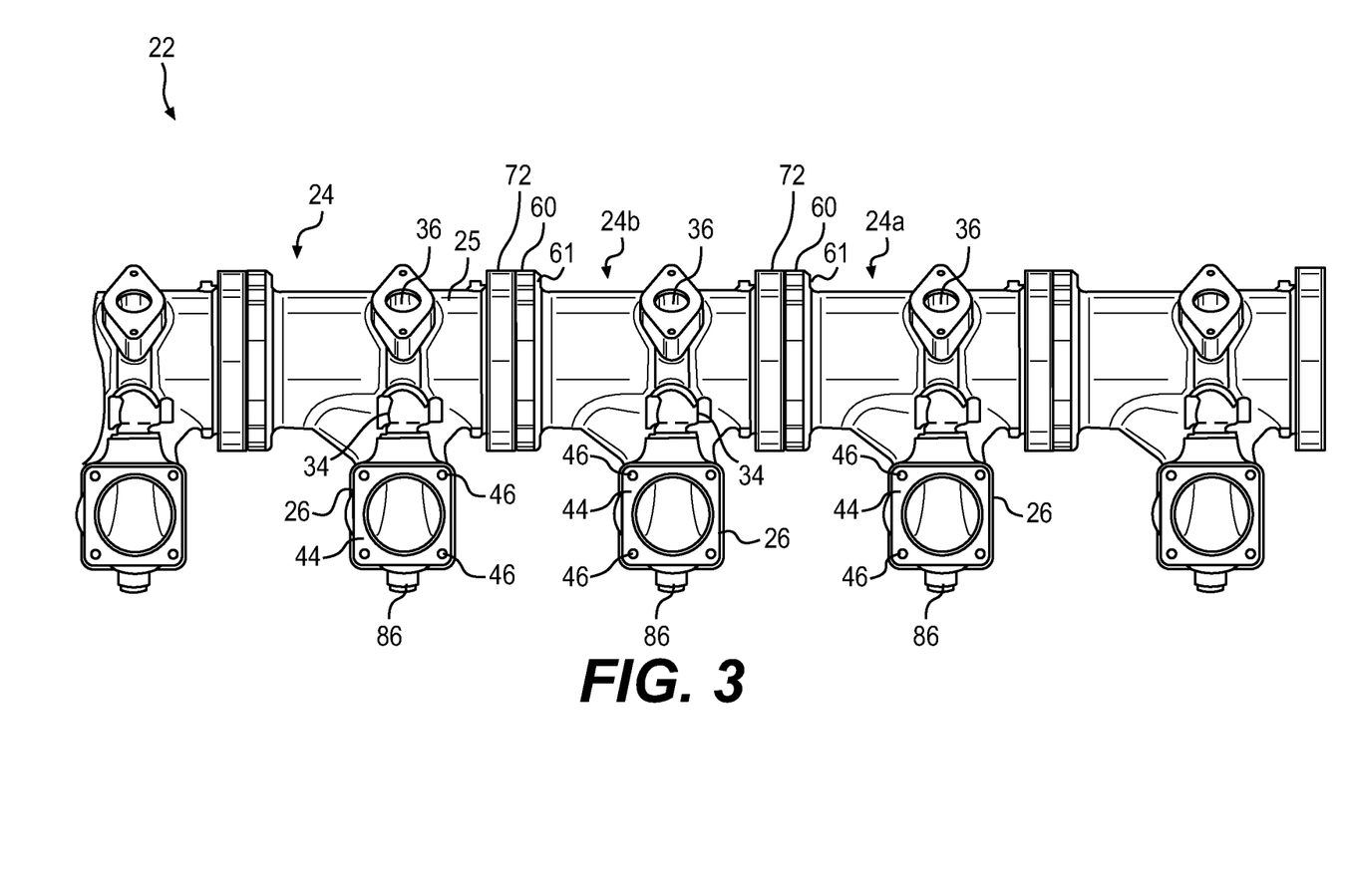
FIG. 3 is an additional perspective view of a plurality of connected exhaust manifold segments, according to one aspect of the present disclosure.

As shown in FIGS. 1 and 2, each exemplary modular exhaust manifold 22 includes a plurality of exhaust manifold segments 24 coupled to one another in end-to-end fashion along a common longitudinal axis of the engine 10. According to some embodiments, the exhaust manifold segments 24 may have a substantially circular cross-section, although other cross-sections are contemplated. According to the exemplary embodiment, the exhaust manifold segments 24 may be configured to direct exhaust gas in a first direction relative to the longitudinal axis. Exhaust manifold 22 and respective exhaust manifold segments 24 may be cast from aluminum or other suitable material.

Each exhaust manifold segment 24 includes an exhaust port 26 configured to receive exhaust gas from an exhaust port of the cylinder head 16. For instance, a first exhaust manifold segment 24a includes a first exhaust port 26a may receive exhaust gas from an exhaust port of the respective cylinder head module 18. Similarly, a second exhaust manifold segment 24b includes a second exhaust port 26b for receiving exhaust gas from a second exhaust port of the respective cylinder head module 18. The first and second exhaust ports 26a and 26b each receive exhaust gases from the cylinder head 16 and, when coupled together to define a modular exhaust manifold such as manifold 22 of FIG. 1, define an engine exhaust tube.

Turning now to FIGS. 3-6, an exemplary exhaust manifold 22 and respective exhaust manifold segments 24 will be discussed in greater detail. Manifold segments 24 include a manifold segment body 25 housing a water jacket tube 28 and an exhaust tube segment 30.

The water jacket tube 28 is configured to receive a liquid coolant. In particular, the water jacket tube 28 defines a liquid coolant passage 32 surrounding an interior of the manifold segment 24 and an exhaust tube segment 30 received within the water jacket tube 28. For instance a first exhaust manifold segment 24a includes a first water jacket tube 28a defining a first liquid coolant passage 32a. Similarly, a second exhaust manifold segment 24b includes a second water jacket tube 28b defining a second liquid coolant passage 32b. The water jacket tubes (e.g., water jacket tubes 28a and 28b), and thus their respective liquid coolant passages (e.g., liquid coolant passages 32a and 32b) are separate from each other and any additional water jacket tubes (and respective liquid coolant passages) of other manifold segments when the manifold segments are coupled to ultimately define the modular exhaust manifold.

Each manifold segment 24 is configured to receive coolant and direct the flow of coolant around the hot surfaces of the interior of the manifold segment 24. According to the exemplary embodiment, the liquid coolant passage 32 defined by the water jacket tube 28 includes an opening or coolant entry port 34 to allow for the inflow of water and air. The entry port 34 may be provided through the engagement face for transferring liquid coolant from a coolant supply to the water jacket tube 28. As shown, the entry port 34 is radially spaced from the exhaust tube segment 30 and may be directly coupled to the coolant supply. Manifold segments 24 are directly connected to a coolant source via the coolant entry port. In operation, liquid coolant, such as water and/or a known coolant (e.g., a glycol-based coolant) may enter a water jacket tube 28 via liquid coolant entry port 34 and substantially fill a liquid coolant passage 32. The coolant is then directed substantially around the exhaust tube segment to surround the interior wall of the exhaust manifold segment 24, cooling the exhaust and shielding the exterior of the manifold segment 24. The cooling and shielding are both accomplished within the casting of the exhaust manifold segment 24. Thus, rather than the coolant entering an exhaust manifold at a first end, flowing around an inside perimeter of the exhaust manifold in its entirety, or jumping from one manifold segment to another, and returning to a coolant return manifold 38 at a second end of the exhaust manifold, the coolant flows from the coolant source into the water jacket tube 28 to cool the individual exhaust manifold segments.

The coolant passages within each manifold segment may also include a jumper 40 configured to control the flow of coolant and prevent air bubbles from forming within the liquid coolant passage 32. When coolant flows up the water jacket tube 28 and enters a first liquid coolant passage portion 42, at least a portion of the coolant may enter and flow through the jumper 40. The coolant may exit the jumper 40 and be directed to flow to a second, non-adjoining liquid coolant passage portion 43 of the water jacket tube 28 that is not otherwise connected to the first portion 42.

According to the exemplary embodiment, the liquid coolant passages defined by the water jacket tube 28 may each include a vent or opening to allow for the exit of water and air. Thus, at least one additional opening or return port 36 may be provided through the manifold segment body 25 for transferring liquid coolant from the water jacket tube 28 to a coolant return manifold 38. Liquid coolant may flow through the liquid coolant passage 32 and exit the water jacket tube 28 via liquid coolant return port 36. Upon exiting the water jacket tube 28, liquid coolant from each exhaust manifold segment may then be directed into the coolant return manifold 38. In some embodiments, the coolant then flows upward to exit the water jacket tube 28 via the return port 36 and out of the top of the manifold segment body 25 to join up with coolant from one or more adjacent exhaust manifold segments in the coolant return manifold 38. As shown, the return port 36 may be radially spaced from the exhaust tube segment and may be directly coupled to the coolant return manifold 38 (as shown in FIG. 1).

Figure 4:
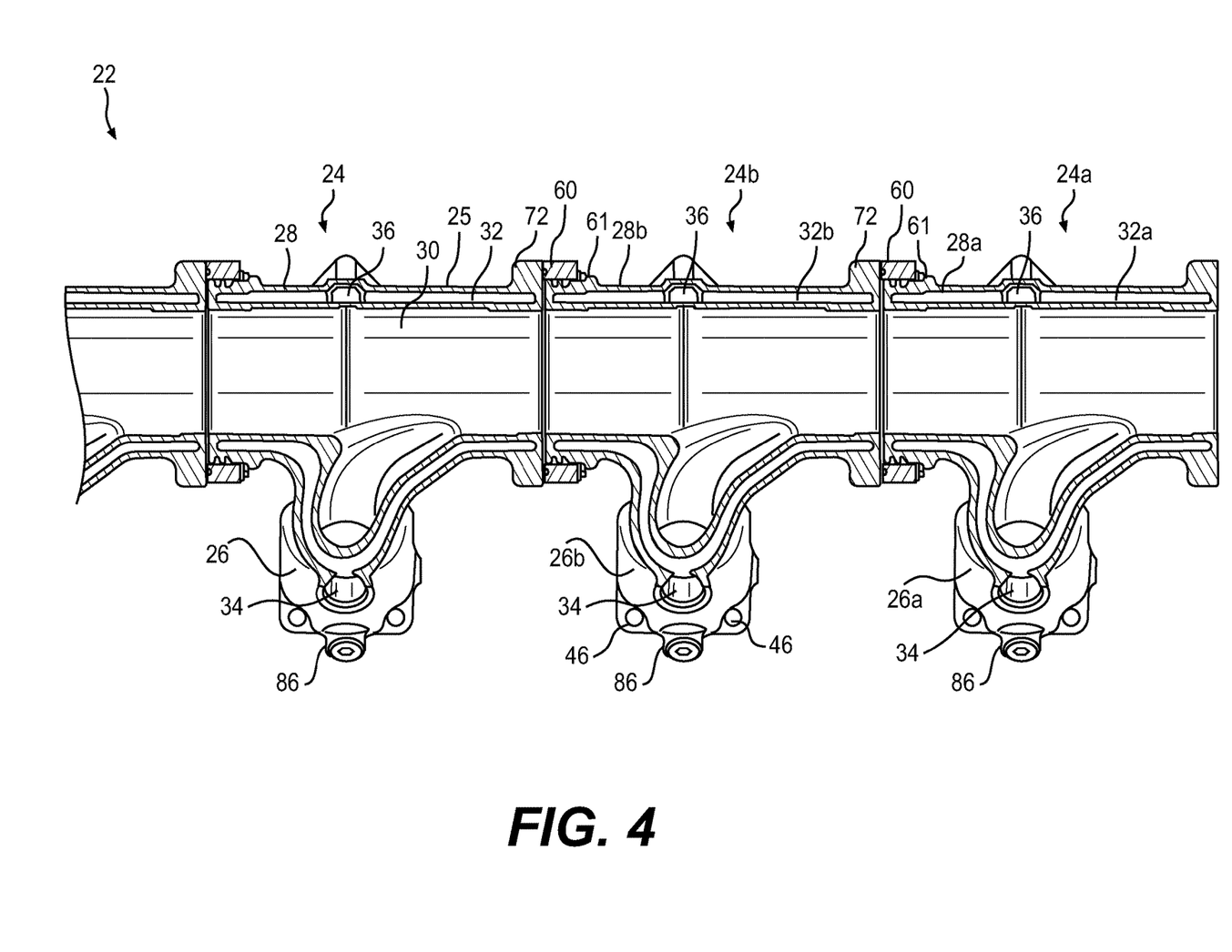
FIG. 4 is a cross-sectional view of portions of a pair of adjacent exhaust manifold segments, according to another aspect of the present disclosure.
Figure 5:
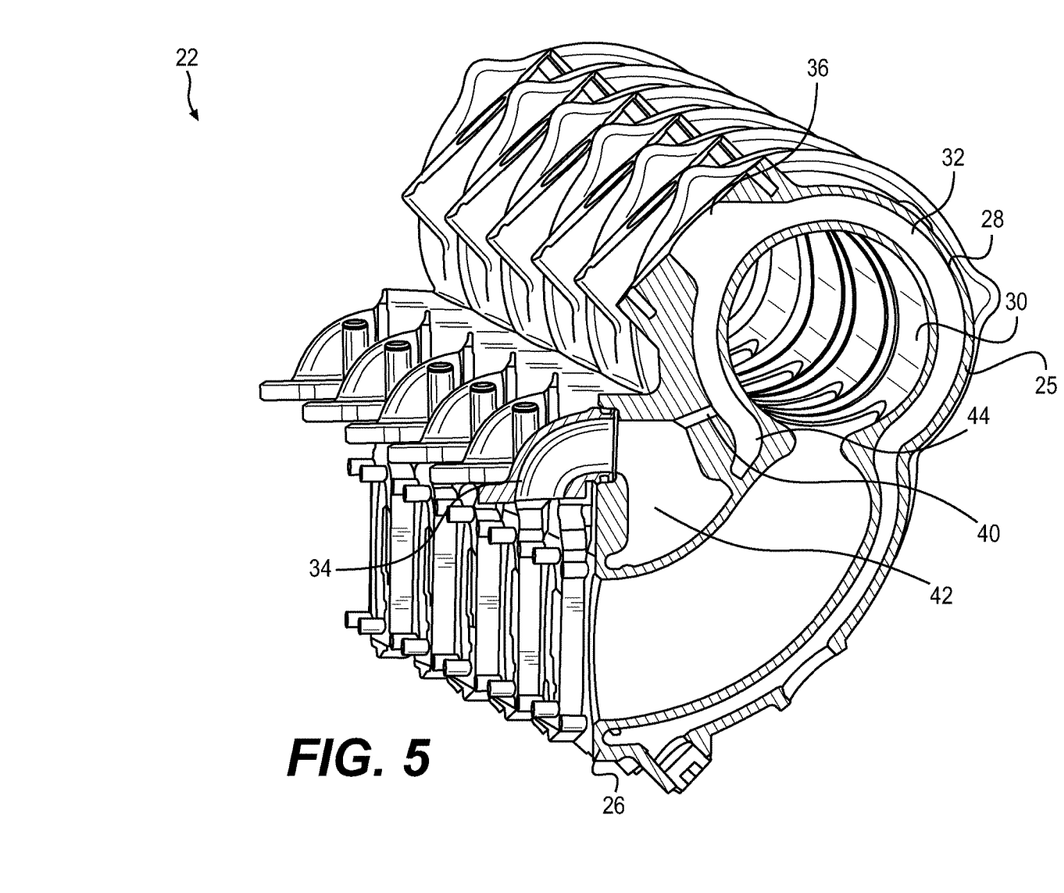
FIG. 5 is side perspective view of a plurality of connected exhaust manifold segments, according to another aspect of the present disclosure.

As can be seen in FIGS. 4-5, the exhaust tube segment 30 of each exhaust manifold segment 24 is telescopically received within a respective water jacket tube 28. As discussed above, each exhaust manifold segment 24 may include an exhaust port 26 configured to provide flow communication between the cylinder head 16 and the exhaust tube segment of each exhaust manifold segment 24. Exhaust port 26 may be any suitable means for fluidly connecting exhaust tube segments with the cylinder head 16. In some embodiments, the engagement face 44 of exhaust port may include a flange configured to receive a similarly shaped gasket (not shown) to seal the exhaust port 26 to the cylinder head 16. A sealing member (not shown) may be positioned along the engagement face 44 and may include a gasket, such as a multiple layers steel (MLS) gasket, positioned over the engagement face 44 and around the exhaust tube segment 30 to seal the exhaust port 26 to the cylinder head. Engagement face 44 may also include a plurality of openings 46 for receiving fastening means (e.g., bolts, screws, etc.) to further secure the exhaust port 26 to the cylinder head 16.

Figure 6:
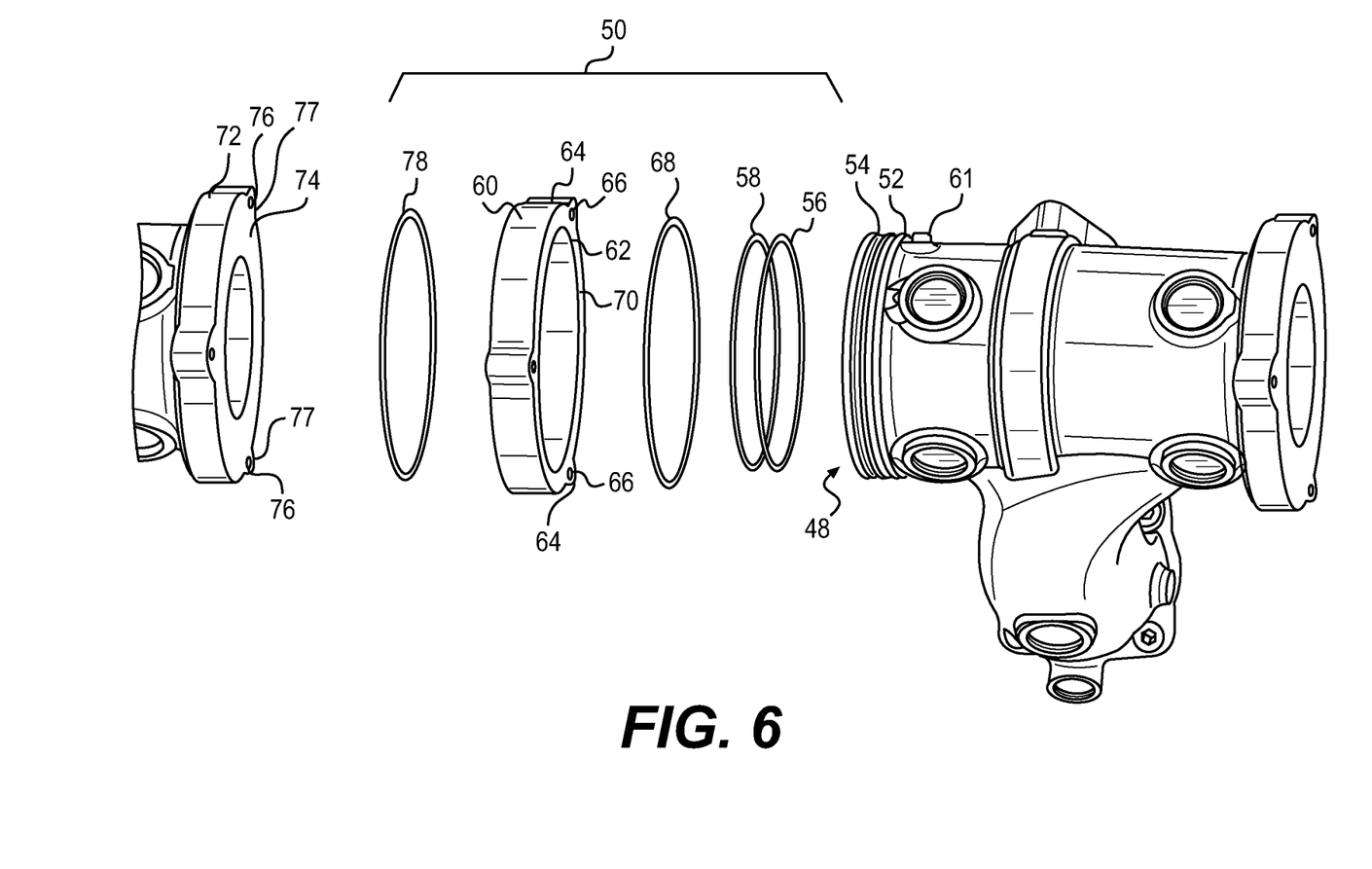
FIG. 6 is a perspective view of a coupling assembly used in conjunction with adjacent exhaust manifold segments.

Turning now to FIG. 6, coupled exhaust manifold segments, which are similar to exhaust manifold segments 24 described above, will be discussed. In particular, and according to the present disclosure, at least one end 48 of each exhaust manifold segment 24 may be configured to receive an expandable coupling assembly 50 or joint configured to accommodate for thermal growth and inhibit warping. The expandable coupling assembly 50 is configured to join one exhaust manifold segment to another exhaust manifold segment. For instance, the expandable coupling assembly 50 may be configured to attach a first manifold segment 24a to a second manifold segment 24b and permit sliding movement of connected manifold segments along a sealing surface of a respective manifold segment relative to adjacent manifold segments. To this end, one or more grooves 52, 54 may be machined into the at least one end 48 of the first manifold segment 24a. The grooves are integral with the manifold segment body 25.

Elastomer annular sealing devices 56, 58 (e.g., O-rings) may be positioned within the one or more grooves 52, 54 machined along an outer perimeter of the first manifold segment end 48. Specifically, each coupling assembly 50 may include at least a first annular seal 56 to be positioned about a first groove 52 formed in the first manifold segment end 48 at a first longitudinal position. Each coupling assembly 50 may further include a second annular seal 58 positioned within a second groove 54 on the first manifold segment end 48 at a second longitudinal position which is spaced from the first longitudinal position.

The coupling assembly 50 also includes a spacing collar 60 or adapter defining an engagement face, or surface, configured for coupling adjacent exhaust manifold segments 24a and 24b together. The spacing collar 60 includes a first engagement surface 62 configured for coupling the first exhaust manifold segment 24a with the second exhaust manifold segment 24b. The spacing collar 60 may include one or more protrusions 64 formed along an outside perimeter of the spacing collar 60 and extending outward to allow manual rotation of the spacing collar 60. Holes 66 may be bored through the protrusions to accommodate coupling mechanisms (e.g., bolts, screws, etc.). The coupling assembly 50 may also include a third annular seal 68 configured to sit within in a corresponding groove 70 formed on the first engagement surface 62 of the spacing collar 60.

At least one opposing end of each manifold segment 24 includes a flat faced fixed radial flange 72 defining an engagement surface 74 or face of the second manifold segment 24b configured for joining with the first manifold segment 24a via the coupling assembly 50. Similarly to the spacing collar 60, the fixed radial flange 72 may also include one or more flange protrusions 76 formed along an outside perimeter of the fixed radial flange 72. Holes 77 may be bored through the protrusions to accommodate coupling mechanisms (e.g., bolts, screws, etc.).

The coupling assembly 50 may also include a fourth annular seal 78 configured to sit within in a corresponding groove 80 (as shown in FIG. 2) formed on second engagement surface 82 of the spacing collar 60. The annular sealing devices 56, 58, 68, and 78 may be positioned outboard of the water jacket tube 28 such that the annular sealing devices 56, 58, 68, and 78 stay as cool as the exterior surface of the exhaust manifold segment body 25 while sealing the exhaust within the manifold 22. Positioning the annular sealing devices 56, 58, 68, and 78 outboard of the water jacket tube 28 allows the sealing devices to remain substantially the same temperature as the exterior surface of the manifold segment body 25.

Annular sealing devices 56, 58 are formed having a first diameter are configured to fit into corresponding radial grooves 52, 54 formed on the outer surface of the first manifold segment end 48. The third and fourth annular sealing devices 68, 78 have a second diameter that is larger than the first diameter and are configured to fit into grooves 70, 80 machined into the engagement surfaces 62, 82 of the spacing collar 60. In some embodiments, the third and fourth annular sealing devices 68, 78 are inserted into grooves 70, 80, with and are mechanically trapped axially behind a lip formed on a respective engagement surface of the spacing collar 60 to prevent annular sealing devices 68, 78 from falling out of the groove. The inner diameter of the third annular sealing device 68 is configured to pilot the outer diameter of the spacing collar 60 to allow the first engagement surface 62 of the spacing collar 60 to slide over the first manifold segment end 24a and align with a corresponding fixed radial flange 72 positioned on the second manifold segment end 24b. Upon fixing the spacing collar 60 over the first and second annular sealing devices 56, 58, the spacing collar may abut a ledge 61 formed on the first exhaust manifold segment end 48, spaced apart from the grooves 52, 54

To secure a first manifold segment 24a to a second manifold segment 24b and form an expandable joint, (e.g., to secure the spacing collar 60 to the fixed radial flange 72), the spacing collar 60 may then be placed over the annular sealing devices 56, 58. The spacing collar 60 may be formed from steel or some other suitable metal alloy. The spacing collar 60 includes a groove machined into the inside of a first engagement face. An inside perimeter surface of the spacing collar 60 may be smooth bored to accept the plurality of annular sealing devices positioned in the above described grooves. Removable fasteners, such as bolts, may be positioned through corresponding openings, such as threaded bores, of each of the spacing collar 60 and the fixed radial flange 72, to secure a coupled position of adjacent exhaust manifold segments 24a and 24b by securing the spacing collar 60 to the fixed radial flange 72. However, alternative coupling means are also contemplated. Any positional misalignment or surface misalignment between the first manifold segment 24a and the second manifold segment 24b may be taken up through the radial/axial motion of the coupling assembly 50. Such a take up of the assembly misalignment allows equal compression on the annular sealing devices 56, 58, 68, and 74.

The above described coupling assembly 50 provides an expandable joint between the first and second exhaust manifold segments 24a and 24b that permits movement of the exhaust manifold segments as the water jacket tubes and shift or bow as a result of thermal expansion.

Exhaust manifold segments 24 may also include a plurality of plugs 84 disposed along the manifold segment body 25. Plugs 84 may provide draining capabilities, for the water jacket tube 28. Exhaust manifold segments 24 may also include a water jacket tube drain plug 86 disposed on a bottom side of the exhaust port 26. Drain plug 86 may similarly provide draining capabilities for the water jacket tube 28.

INDUSTRIAL APPLICABILITY

The present disclosure may be applicable to internal combustion engines having exhaust manifolds. Further, the present disclosure may be applicable to exhaust manifolds having water jackets for reducing the skin temperature of the exhaust manifold. Further, the present disclosure may be applicable to modular manifold designs offering improved manufacturability and serviceability. Yet further, the present disclosure may be applicable to strategies for sealing joints between exhaust manifold segments of a water jacket cooled modular exhaust manifold.

Referring generally to FIGS. 1-6, an exemplary internal combustion engine 10 generally includes a cylinder block 12 defining a plurality of cylinders 14. A cylinder head 16 is coupled to the cylinder block 12 and provides intake and exhaust flow communication with the cylinders 14. The exemplary engine 10 also includes a modular exhaust manifold 22, as disclosed herein, coupled to each cylinder head 16 to provide flow communication between exhaust ports of the cylinder head 16 and the surroundings. As shown in FIG. 1, each exemplary modular exhaust manifold 22 includes a plurality of exhaust manifold segments 24 coupled to one another in end-to-end fashion along a common longitudinal axis of the engine 10.

The modular exhaust manifold 22, as described herein, includes a plurality of exhaust manifold segments, each including a manifold segment body 25 housing a water jacket tube 28 and an exhaust tube segment 30. The water jacket tube 28 is configured to receive a liquid coolant. In particular, the water jacket tube 28 defines a liquid coolant passage 32 surrounding an interior of the manifold segment 24 and an exhaust tube segment 30 received within the water jacket tube 28. For instance a first exhaust manifold segment 24a includes a first water jacket tube 28a defining a first liquid coolant passage 32a. Similarly, a second exhaust manifold segment 24b includes a second water jacket tube 28b defining a second liquid coolant passage 32b. The water jacket tubes (e.g., water jacket tubes 28a and 28b), and thus their respective liquid coolant passages (e.g., liquid coolant passages 32a and 32b) are separate from each other and any additional water jacket tubes (and respective liquid coolant passages) of other manifold segments when the manifold segments are coupled to ultimately define the modular exhaust manifold 22.

At least one end 48 of each exhaust manifold segment 24 may be configured to receive an expandable coupling assembly 50 or joint configured to accommodate for thermal growth and inhibit warping. The expandable coupling assembly 50 is configured to join one exhaust manifold segment to another exhaust manifold segment. For instance, the expandable coupling assembly 50 may be configured to attach a first manifold segment 24a to a second manifold segment 24b and permit sliding movement of connected manifold segments along a sealing surface of a respective manifold segment relative to adjacent manifold segments. To this end, one or more grooves 52, 54 may be machined into the at least one end 48 of the first manifold segment 24a. The grooves are integral with the manifold segment body 25.

Elastomer annular sealing devices 56, 58 (e.g., O-rings) may be positioned within the one or more grooves 52, 54 machined along an outer perimeter of the first manifold segment end 48. Specifically, each coupling assembly 50 may include at least a first annular seal 56 to be positioned about a first groove 52 formed in the first manifold segment end 48 at a first longitudinal position. Each coupling assembly 50 may further include a second annular seal 58 positioned within a second groove 54 on the first manifold segment end 48 at a second longitudinal position which is spaced from the first longitudinal position.

The coupling assembly 50 also includes a spacing collar 60 or adapter defining an engagement face, or surface, configured for coupling adjacent exhaust manifold segments 24a and 24b together. The spacing collar 60 includes a first engagement surface 62 configured for coupling the first exhaust manifold segment 24a with the second exhaust manifold segment 24b. Spacing collar 60 may include one or more spacing collar protrusions 64 formed along an outside perimeter of the spacing collar 60 to allow manual rotation of the spacing collar 60. Spacing collar holes 66 may be bored through the protrusions 64 to accommodate coupling mechanisms (e.g., bolts, screws, etc.). The coupling assembly 50 may also include a third annular seal 68 configured to sit within in a corresponding groove 70 formed on the first engagement surface 62 of the spacing collar 60.

At least one opposing end of each manifold segment 24 includes a flat faced fixed radial flange 72 defining a radial flange engagement surface 74 or face of the second manifold segment 24b configured for joining with the first manifold segment 24a via the coupling assembly 50. Similarly to the spacing collar 60, the fixed radial flange 72 may also include one or more radial flange protrusions 76 formed along an outside perimeter of the fixed radial flange 72. Radial flange holes 77 may be bored through the protrusions to accommodate coupling mechanisms (e.g., bolts, screws, etc.).

The coupling assembly 50 may also include a fourth annular seal 78 configured to sit within in a corresponding groove 80 (as shown in FIG. 2) formed on second engagement surface 82 of the spacing collar 60. The annular sealing devices 56, 58, 68, and 78 may be positioned outboard of the water jacket tube 28 such that the annular sealing devices 56, 58, 68, and 78 stay as cool as the exterior surface of the exhaust manifold segment body 25 while sealing the exhaust within the manifold 22. Positioning the annular sealing devices 56, 58, 68, and 78 outboard of the water jacket tube 28 allows the sealing devices to remain substantially the same temperature as the exterior surface of the manifold segment body 25.

The modular exhaust manifold providing direct connect cooling for individual manifold segments and a coupling assembly configured to accommodate for thermal expansion of the manifold segments provides advantages at least from a manufacturability and/or serviceability standpoint. In particular, by utilizing a plurality of similar exhaust manifold segments 24, similar parts may be manufactured for engines of different sizes and/or configurations. For example, manufacturing the engine 10 shown in FIG. 1 requires the use of six exhaust manifold segments 24 for each cylinder head 16, with each exhaust manifold segment 24 corresponding to two cylinders 14. The resulting V-12 engine 10 thus requires the use of six exhaust manifold segments 24. Manufacturing a V-16 engine, however, may require the use of eight of the exhaust manifold segments 24.

Serviceability may also be improved by the modularity of the manifold design. In particular, maintenance times and resulting costs may be reduced by minimizing the number of parts to be removed during the servicing or repair. In particular, accessing a cylinder 14 or cylinder head module 18 may require removal of only the corresponding exhaust manifold segment 24 without the need to remove the entire exhaust manifold 22. Thus, according to the modular exhaust manifold 22 disclosed herein, it may be possible to perform maintenance associated with one cylinder 14 more easily relative to an engine that includes a unitary manifold.

As described above, and with reference to FIGS. 3-6, adjacent exhaust manifold segments, for example, segments 24a and 24b, each include a The modular exhaust manifold disclosed herein includes improved sealing at the joints between segments of the manifold. In particular, each joint includes independent direct connection of the water jacket tubes to the coolant source. The direct coolant supply connections provided herein improve the cooling of individual manifold segments in a large modular exhaust manifolds. In addition, the above described expandable coupling assembly configured to accommodate thermal expansion of individual exhaust manifold segments when joined together can reduce wear and potential damage to the manifold segments.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. An internal combustion engine, comprising:
    a cylinder block defining at least one cylinder;
    a cylinder head coupled to the cylinder block; and
    a modular exhaust manifold coupled to the cylinder head and configured to receive exhaust gas from the cylinder head, wherein the modular exhaust manifold includes a plurality of exhaust manifold segments coupled together along a common axis, and wherein each of the exhaust manifold segments includes a separate water jacket tube defining a separate liquid coolant passage around each of the plurality of exhaust manifold segments; and
    a coupling assembly for joining adjacent exhaust manifold segments, the coupling assembly including a plurality of annular sealing devices including at least a first annular sealing device and a second annular sealing device configured to fit within a first set of grooves formed on an end portion of a first exhaust manifold segment and a spacing collar configured to attach to the end portion of the first exhaust manifold segment and couple with a fixed radial flange formed on an adjacent end portion of a second exhaust manifold segment to join the first exhaust manifold segment and the second exhaust manifold segment.

2. The internal combustion engine of claim 1, wherein each of the water jacket tubes includes a coolant entry port configured to connect to a coolant supply.

3. The internal combustion engine of claim 1, wherein each of the water jacket tubes includes a jumper configured to direct coolant from a first water jacket tube portion to a second non-adjoining water jacket tube portion.

4. The internal combustion engine of claim 1, wherein each of the water jacket tubes includes a coolant return port configured to connect to a coolant return manifold.

5. The internal combustion engine of claim 1, wherein the spacing collar includes first and second opposing engagement faces, wherein the first and second engagement faces include respective grooves configured to accommodate third and fourth annular sealing devices.

6. The internal combustion engine of claim 5, wherein the first, second, third, and fourth annular sealing devices are outboard of the water jacket tube.

7. The internal combustion engine of claim 5, wherein the first and second annular sealing devices have a first diameter and the third and fourth annular sealing devices have a second diameter larger than the first diameter.

8. The internal combustion engine of claim 1, further including:
    wherein each of the spacing collar and the fixed radial flange include protrusions extending outward from an outer radial surface, and wherein the protrusions each include an opening through which a fastener is received.

9. The internal combustion engine of claim 1, wherein an inside perimeter surface of the spacing collar is smooth bored to accept the first and second annular sealing devices when positioned in their respective grooves.

10. A modular exhaust manifold for an internal combustion engine, comprising:
    a first exhaust manifold segment including a first a water jacket tube defining a liquid coolant passage around the first exhaust manifold segment;
    a second exhaust manifold segment coupled to the first exhaust manifold segment along a common axis, the second exhaust manifold segment including a second water jacket tube, separate from the first water jacket tube, defining a second liquid coolant passage around the second exhaust manifold segment, wherein each of the first and second water jacket tubes are directly connected to a coolant supply; and
    a coupling assembly for joining the first exhaust manifold segment and the second exhaust manifold segment, the coupling assembly including a plurality of annular sealing devices configured to fit within a first set of grooves formed on an end portion of the first exhaust manifold segment and a spacing collar configured to attach to the end portion of the first exhaust manifold segment and couple with a fixed radial flange formed on an adjacent end portion of the second exhaust manifold segment to join the first exhaust manifold segment and the second exhaust manifold segment.

11. The modular exhaust manifold of claim 10, wherein each of the water jacket tubes includes a coolant entry port configured to connect to a coolant supply.

12. The modular exhaust manifold of claim 10, wherein each of the water jacket tubes includes a jumper configured to direct coolant from a first water jacket tube portion to a second non-adjoining water jacket tube portion.

13. The modular exhaust manifold of claim 10, wherein each of the water jacket tubes includes a coolant return port configured to connect to a coolant return manifold.

14. The modular exhaust manifold of claim 10, wherein the spacing collar includes first and second opposing engagement faces, wherein the first and second engagement faces include respective grooves configured to accommodate third and fourth annular sealing devices.

15. The modular exhaust manifold of claim 14, wherein the first, second, third, and fourth annular sealing devices are outboard of the water jacket tube.

16. The modular exhaust manifold of claim 14, wherein the first and second annular sealing devices have a first diameter and the third and fourth annular sealing devices have a second diameter larger than the first diameter.

17. The modular exhaust manifold of claim 10, further including:
wherein each of the spacing collar and the fixed radial flange include protrusions extending outward from an outer radial surface, and wherein the protrusions each include an opening through which a fastener is received.

18. The modular exhaust manifold of claim 10, wherein an inside perimeter surface of the spacing collar is smooth bored to accept the first and second annular sealing devices when positioned in their respective grooves.

19. A modular exhaust manifold for an internal combustion engine, comprising:
a first exhaust manifold segment;
a second exhaust manifold segment; and
a coupling assembly for joining the first exhaust manifold segment and the second exhaust manifold segment along a common axis, the coupling assembly including a plurality of annular sealing devices configured to fit within a first set of grooves formed on an end portion of the first exhaust manifold segment and a spacing collar configured to attach to the end portion of the first exhaust manifold segment and couple with a fixed radial flange formed on an adjacent end portion of the second exhaust manifold segment to join the first exhaust manifold segment and the second exhaust manifold segment.

20. The modular exhaust manifold of claim 19, wherein the first exhaust manifold segment includes a first water jacket tube defining a first liquid coolant passage around the first exhaust manifold segment, and the second exhaust manifold segment includes a second water jacket tube that is separate from the first water jacket tube defining a second liquid coolant passage around the second exhaust manifold segment, and wherein each of the first and second water jacket tubes includes a jumper configured to prevent air bubbles from forming within the first and second liquid coolant passages.

\* \* \* \* \*